US011119837B2

(12) United States Patent
Chai et al.

(10) Patent No.: US 11,119,837 B2
(45) Date of Patent: Sep. 14, 2021

(54) METHOD, DEVICE, AND APPARATUS FOR REALIZING APPLICATION FUNCTION, AND STORAGE MEDIUM

(71) Applicant: BAIDU ONLINE NETWORK TECHNOLOGY (BEIJING) CO., LTD., Beijing (CN)

(72) Inventors: Qiaozi Chai, Beijing (CN); Wei Zhang, Beijing (CN); Yanzhao Yang, Beijing (CN); Lili Long, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/966,557

(22) PCT Filed: Jan. 18, 2019

(86) PCT No.: PCT/CN2019/072340
§ 371 (c)(1),
(2) Date: Jul. 31, 2020

(87) PCT Pub. No.: WO2019/237740
PCT Pub. Date: Dec. 19, 2019

(65) Prior Publication Data
US 2020/0364102 A1 Nov. 19, 2020

(30) Foreign Application Priority Data
Jun. 13, 2018 (CN) .......................... 201810610018.1

(51) Int. Cl.
G06Q 20/02 (2012.01)
G06F 9/54 (2006.01)
G06F 21/62 (2013.01)

(52) U.S. Cl.
CPC ............ G06F 9/547 (2013.01); G06F 21/629 (2013.01)

(58) Field of Classification Search
CPC .............................. G06F 9/547; G06F 21/629
See application file for complete search history.

(56) References Cited

U.S. PATENT DOCUMENTS 10,915,925 B2 * 2/2021 Ding .................. G06Q 30/0277
2015/0328547 A1 * 11/2015 Uriu ........................ A63F 13/48
463/42

(Continued)

FOREIGN PATENT DOCUMENTS

CN 106600403 A 4/2017
CN 107423973 A 12/2017

(Continued)

OTHER PUBLICATIONS

International Search Report for PCT Application No. PCT/CN2019/072340, dated Apr. 2, 2019, 13 pages.

(Continued)

Primary Examiner — Doon Y Chow
Assistant Examiner — Abdou K Seye
(74) Attorney, Agent, or Firm — Fay Sharpe LLP

(57) ABSTRACT

A method for realizing an application function, a device and a storage medium are provided. The method is implemented in a service platform. The method includes the following. An access interface of an application function issued by a registered party is provided. A transaction request of transferring assets that is generated when another registered party operates the access interface of the application function is obtained. The transaction request of transferring assets is sent to a blockchain network and is added to a blockchain.

14 Claims, 10 Drawing Sheets

(56) References Cited

U.S. PATENT DOCUMENTS

| | | | |
|---|---|---|---|
| 2016/0224977 A1 | 8/2016 | Sabba | |
| 2016/0342989 A1 | 11/2016 | Davis | |
| 2017/0116693 A1 | 4/2017 | Rae et al. | |
| 2019/0223141 A1* | 7/2019 | You | H04W 8/24 |
| 2019/0238581 A1* | 8/2019 | Song | H04L 63/1416 |
| 2019/0253260 A1 | 8/2019 | Uehara et al. | |
| 2019/0325522 A1* | 10/2019 | Bathia | G06K 9/00785 |
| 2019/0362361 A1* | 11/2019 | Irazabal | H04L 63/0428 |

FOREIGN PATENT DOCUMENTS

| | | | |
|---|---|---|---|
| CN | 107451812 A | 12/2017 | |
| CN | 107491948 A | 12/2017 | |
| CN | 107730384 A | 2/2018 | |
| CN | 107851246 A | 3/2018 | |
| CN | 108154439 A | 6/2018 | |
| JP | 2016527615 A | 9/2016 | |
| JP | 2017527927 A | 9/2017 | |
| JP | 6340107 B1 | 6/2018 | |
| WO | 2018099551 A1 | 6/2018 | |

OTHER PUBLICATIONS

Office Action for Chinese Application No. 201810610018.1, dated Dec. 2, 2019, 17 pages.
Koyama, "Spells of Genesis & Blockchain Information Station Season 4, start of Season 5", Registration No. 225842, Delivery Date: Jun. 15, 2021, 3 pages.
Koyama, "Block chains made by themselves", Send serial No. 225843 Send date: Jun. 15, 2003, 15 pages.
English translation of Koyama, "Spells of Genesis & Blockchain Information Station Season 4, start of Season 5", Registration No. 225842, Delivery Date: Jun. 15, 2021, 3 pages.
English translation of Koyama, "Block chains made by themselves", Send serial No. 225843 Send date Jun. 15, 2003, 6 pages.
Office Action for JP application No. 2020-529588, dated Jun. 15, 2021, 4 pages.
English translation of Office Action for JP application No. 2020-529588, dated Jun. 15, 2021, 4 pages.

* cited by examiner

METHOD, DEVICE, AND APPARATUS FOR REALIZING APPLICATION FUNCTION, AND STORAGE MEDIUM

This application is a US national phase application of International Application No. PCT/CN2019/072340, filed on Jan. 18, 2019, which is based upon and claims priority to Chinese Patent Application No. 201810610018.1, filed on Jun. 13, 2018, the entire contents of which are incorporated herein by reference.

FIELD

Embodiments of the present disclosure relate to blockchain data processing technologies, for example, relate to a method and an apparatus for implementing an application function, a device and a storage medium.

BACKGROUND

Blockchain is a new application mode of a computer technology such as distributed data storage, point-to-point transmission, consensus mechanism, and encryption algorithm. Advantages of the blockchain technology are decentralization and reliable data storage, which may prevent from being tampered, thereby improving credibility and transparency of an application function implemented based on a blockchain network.

SUMMARY

Subject matters of the present disclosure will be described in detail below. This summary does not limit the protection scope of the claims.

Embodiments of the present disclosure provide a method and an apparatus for implementing an application function, a device and a storage medium, to effectively utilize the blockchain network technology to implement various application functions.

Embodiments of the present disclosure provide a method for implementing an application function applied to a service platform. The method includes: providing an access interface of an application function issued by a registered party; obtaining a transaction request of transferring assets that is generated when another registered party performs an operation on the access interface of the application function; and sending the transaction request of transferring assets to a blockchain network, such that the transaction request of transferring assets is added to a blockchain.

Further embodiments of the present disclosure provide a device. The device includes one or more processors and a storage device. The storage device is configured to store one or more programs. When the one or more programs are executed by the one or more processors, the one or more processors are caused to implement the method for implementing the application function according to any one of embodiments of a first aspect.

Further embodiments of the present disclosure provide a storage medium having a computer program stored thereon. When the computer program is executed by a processor, the method for implementing the application function according to any one of embodiments of the first aspect is executed.

Other aspects may be understood after reading and understanding accompanying drawings and detailed description.

DETAILED DESCRIPTION

Detailed description will be further made below to the present disclosure with reference to accompanying drawings and embodiments. It may be understood that, embodiments described herein are intended only to explain the present disclosure, and are not intended to limit the present disclosure. In addition, it should be noted that, for convenience of description, the accompanying drawings merely illustrate some but not all of the contents related to the present disclosure.

At present, popularization of a blockchain network has certain technical difficulties. The blockchain network has a high requirement on hardware of nodes. Therefore, it is hard to establish the blockchain network. Even if the blockchain network is established, an initial procedure of forming the blockchain is relatively difficult. An amount of data in the blockchain is limited due to a limited number of users involved and a limited number of transaction requests interacted.

Therefore, it is difficult for most of small and medium-sized organizations, third-party application developers and ordinary users to implement the application function based on the blockchain network.

In view of this, embodiments of the present disclosure provide a method and an apparatus for implementing an application function, a related device and related storage medium, which will be described below.

Figure 1:
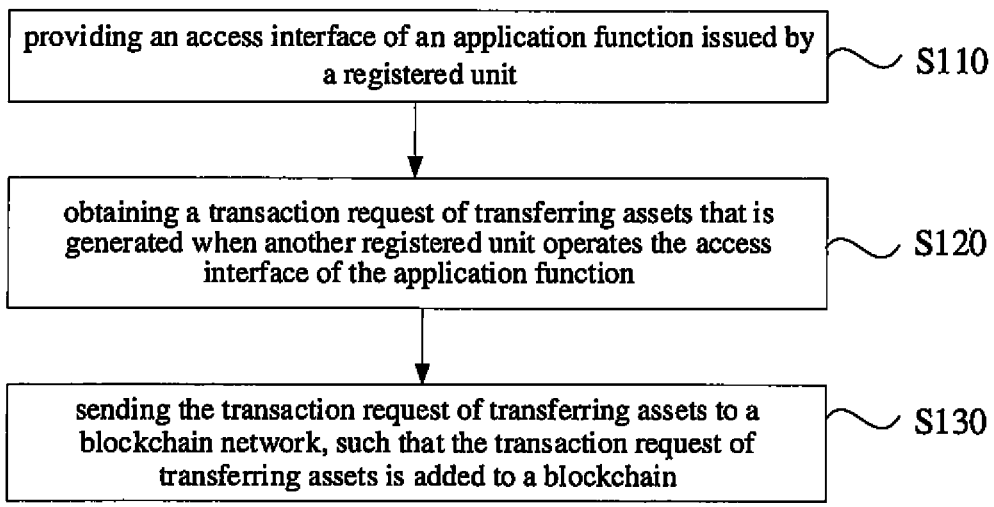
FIG. 1 is a flow chart illustrating a method for implementing an application function according to Embodiment 1 of the present disclosure.

FIG. 1 is a flow chart illustrating a method for implementing an application function according to Embodiment 1 of the present disclosure. Embodiments may be applicable to a case of implementing various function applications based on a blockchain network. The method may be applied to a service platform. The service platform may allow various users and institutions to log in as a registered party and may establish and promote application functions. This platform may be a node of the blockchain network, and integrated in a computing device carrying the node of the blockchain system. In another example, the platform may be a service platform that independent of the blockchain network, but is capable of interacting with the node in the blockchain network. For example, data on the platform may be uploaded to the blockchain network. The service platform may be an independent physical device or a service platform composed of a cluster of distributed devices. The service platform may implement and promote the application functions issued by most of small and medium-sized organizations, third-party application developers and ordinary users, and may allow various registered parties to implement the application functions. Therefore, the service platform may be called as universe.

The method may be executed by an apparatus for implementing an application function according to embodiments of the present disclosure. The apparatus may be configured in software and/or hardware, and arranged in the service platform. As illustrated in FIG. 1, the method may include the following.

At block S110, an access interface of an application function issued by a registered party is provided.

The registered party is an independent individual, such as an ordinary user, an institution that operates an application function, or a third-party application developer. In embodiments, the registered party may be called as planet. Each registered party corresponds to one planet. Each planet may not issue any application function or issue one or more application functions. For a certain user or a certain institution, when there is a need to issue multiple application functions, multiple different registered parties may be registered, i.e., multiple planets.

The application function refers to an application program that provides, by means of the service platform, content or service to other registered parties. The access interface refers to a page of the application function, i.e., a page for providing the application function to other registered party.

In detail, the access interface of the application function may be provided to a registered party A when the service platform detects that the registered party A accesses the application function issued by another registered party B. In another example, the access interface of the application function issued by the registered party B may be displayed to other registered parties supported by the service platform when the service platform receives the application function issued by the registered party B.

At block S120, a transaction request of transferring assets that is generated when another registered party performs an operation on the access interface of the application function is obtained.

The assets refer to an element circulating on the service platform, also referred as a Token, a pass certificate or a star diamond, which may be circulated within the blockchain network and is a means to reward or punish the registered party. The transaction request of transferring assets refers to a transaction request generated on the service platform based on a condition of transferring assets between the registered parties. The transaction request of transferring assets may include: the amount of assets transferred and identifiers of the registered parties between which the assets are transferred. The identifier of the registered party refers to an identity for uniquely identifying the registered party, such as a name or an ID of the registered party.

In an example, the transaction request of transferring assets may be generated when one of two registered parties accesses the access interface of the application function issued by another one of two registered parties. In another example, the transaction request of transferring assets may be generated when an account transfer is operated between two registered parties by means of the access interface of the application function issued by other registered parties.

In detail, when the registered party desires to implement the application function issued by an registered party and provided by the service platform, the registered party needs to pay a certain amount of assets to the registered party issuing the application function. The service platform may obtain in real time the transaction request of transferring assets that is generated by transferring the assets between the registered parties.

It should be noted that, the registered party may be called as planet, and the assets may be called as element correspondingly. The elements may be gathered continuously to form the planet that is capable of issuing the application function. A size of the planet has a positive correlation to the number of elements held by the registered party.

At block S130, the transaction request of transferring assets is sent to a blockchain network, and the transaction request of transferring assets is added to a blockchain.

In detail, the service platform may transmit the transaction request of transferring assets to the blockchain network through an interface through which the service platform interacts with the blockchain network, such that a node of the blockchain network for generating a block may add the transaction request of transferring assets into the blockchain.

In order to facilitate the service platform to quickly query the condition of transferring the assets between the registered parties subsequently, in an example, after the transaction request of transferring assets is sent to the blockchain network and added into the blockchain, the method may also include: receiving a block address where the transaction request of transferring assets sent by the node in the blockchain network for generating the block is stored in the blockchain network.

With the technical solution according to embodiments of the present disclosure, the service platform may provide powerful support of the blockchain network for various users and institutions to register various units, issue or implement various application functions, and provide circulating assets. Therefore, various registered parties may implement the application function based on the blockchain technology without establishing the blockchain network by themselves. In detail, the service platform may obtain the transaction request of transferring assets between the registered parties in time through the provided access interface of the application function issued by the registered party, and send the transaction request of transferring assets to the blockchain network for storing. As the transaction request of transferring assets between the registered parties is stored in the blockchain network, the blockchain network technology is effectively utilized to implement various application functions.

In order to facilitate each registered party to quickly find a desired application function, in an example, the method may further include the following. Information of each application function issued on the service platform is obtained, and the information is added to a search interface for querying and linking various access interface of application function by the registered party.

The information of the application function may include name of the application function, brief introduction of the application function, registered party associated with the application function and condition of paying assets. The search interface may also be referred as an exploration interface, which is provided on the service platform for searching and querying the application function provided by an existing registered party. In an example, the service platform may dynamically update the search interface with the addition and removal of application functions.

In detail, the service platform may obtain information of various application functions issued by each registered party on the service platform in real time and analyze the obtained information of each application function. The application function that does not conform to an issuing rule of the service platform may be removed. The remaining application functions may be compared with all application functions existing on the search interface. In cases that one application function is not the same as the application functions existing on the search interface, this application function may be added to the search interface, such that each registered party may query and link the access interface of each application function.

It should be noted that, there is no execution order among this action and blocks S110, S120 and S130 in embodiments. This action and blocks S110, S120 and S130 may be executed simultaneously.

Embodiment 2

Figure 2:
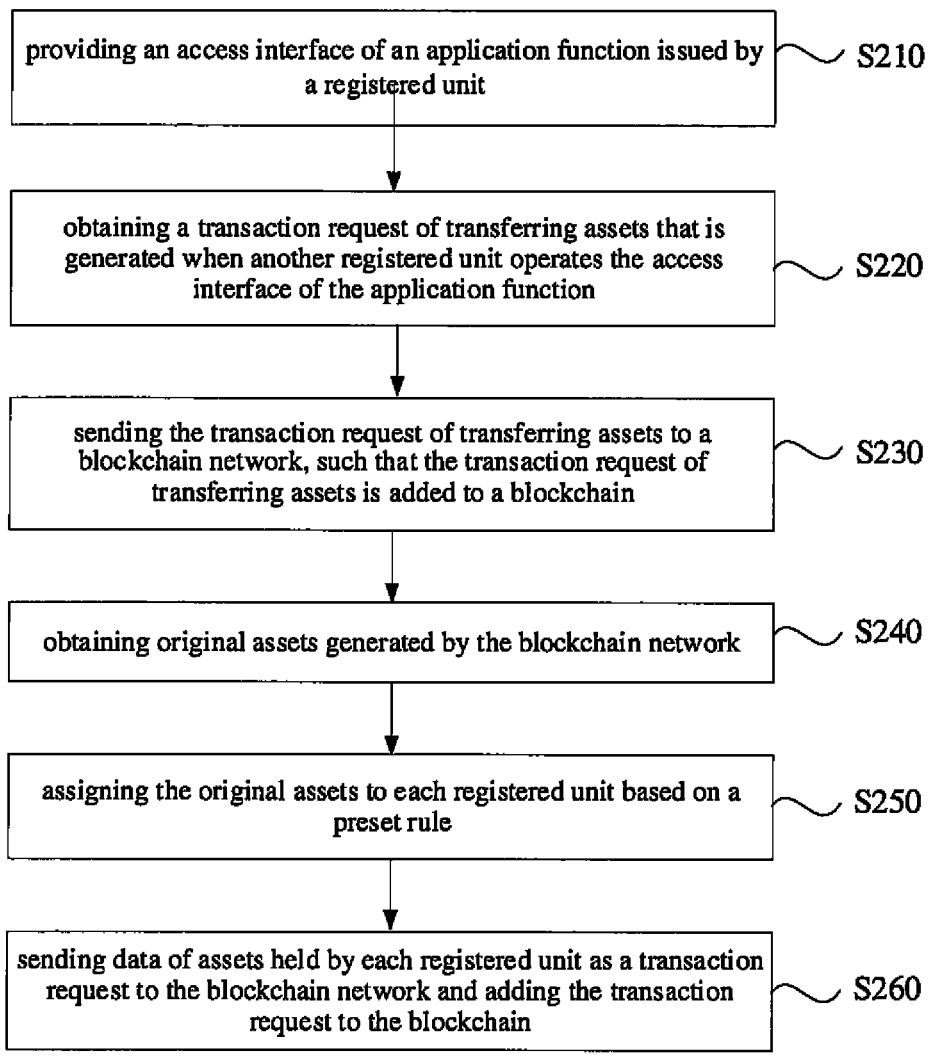
FIG. 2 is a flow chart illustrating a method for implementing an application function according to Embodiment 2 of the present disclosure.

FIG. 2 is a flow chart illustrating a method for implementing an application function according to Embodiment 2 of the present disclosure. This embodiment provides more details on the basis of the above embodiments. As illustrated in FIG. 2, the method may include the following.

At block S210, the access interface of the application function issued by the registered party is provided.

At block S220, the transaction request of transferring assets that is generated when another registered party performs an operation on the access interface of the application function is obtained.

At block S230, the transaction request of transferring assets is sent to the blockchain network and added to the blockchain.

At block S240, original assets generated by the blockchain network are obtained.

The original assets may be generated by the blockchain network and circulated on the service platform. In detail, the service platform may receive the original assets sent by the blockchain network through an interface through which the service platform may interact with the blockchain network. In an example, the blockchain network may provide the original assets to the service platform periodically. For example, annual original assets may be provided to the service platform at a time.

At block S250, the original assets are assigned to each registered party based on a preset rule.

The preset rule is an assigning rule set in advance. The original assets may be assigned according to a composite score of one or more of a permission/identity level, an activity level, a weight value, an economic capacity and a hardware capability of the registered party.

The permission/identity level corresponds to a permission of issuing the application function by the registered party. The higher the permission/identity level, the more the application functions issued. The activity level may be the number of times for issuing information by the registered party or a login frequency by the registered party. The economic capacity may be a total amount of assets held by the registered party now. The weight value is a score value of each registered party on the service platform, which may also be referred as gravitation, calculation power (hashrate) or force. The weight value is an important basis for the service platform to assign the assets.

In an example, assigning the original assets to each registered party based on the preset rule may include: assigning the original assets to each registered party based on the weight values of respective registered parties.

In detail, the weight value may be obtained by weighting each score value of respective item of the registered party via the service platform. When the score value of an item changes, the weight value may change accordingly. In an example, the weight value of the registered party may be adjusted based on at least one of (1) the login state of the registered party on the service platform, (2) the condition of issuing and operating the application function by the registered party, and (3) the number of new registered parties invited by the registered party.

In detail, the adjustment rule may be as follows. When other items keep unchanged, the higher the frequency of login, the greater the weight value is. For example, the weight value of the registered party that logs in every day is higher than the weight value of the registered party that logs in less frequently. In addition, when other items keep unchanged, both the number of times that the registered party issues the application function and the frequency that other registered parties use the application function are directly proportional to the weight value. In cases of the information of the issued application function is useless or does not conform to provisions of the service platform, the weight value may be reduced based on a certain rule. When other items keep unchanged, the number of new registered parties invited by the registered party is proportional to the weight value.

In detail, the service platform may obtain the weight values of the registered parties, arrange the weight values of the registered parties in a descending order, and assign the original assets to each registered party from a large weight value to a small weight value based on the descending order of the weight values.

It should be noted that, the registered party may be called as the planet, the assets may be called as the element, and correspondingly the weight value may be called as gravitation. The more elements are obtained, the greater the mass of the planet is. The greater the mass, the greater the gravitation is. The greater the gravitation, the more elements may be obtained. In this way, the relationship among the planet, the gravitation and the assets may be provided to a user through the above visualized example.

At block S260, data of assets held by the registered party is sent to the blockchain network as a transaction request and added to the blockchain.

The data of assets refers to data of assets obtained after the registered party is assigned with new assets.

In detail, the service platform sends the data of assets held by the registered party as the transaction request to the blockchain network through the interface through which the service platform interacts with the blockchain network. The node in the blockchain network for generating a block may add the transaction request to the blockchain. When the assets held by the registered party change, this change needs to be issued to the blockchain for storing. For example, startup assets may be assigned during a first registration.

It should be noted that, in embodiments, there is no execution order between blocks S210, S220, and S230 for storing the transaction request of transferring assets generated between the registered parties in the blockchain and blocks S240, S250, and S260 for storing data of the original assets assigned to each registered party in the blockchain. Those blocks may be executed simultaneously.

With the technical solution according to embodiments of the present disclosure, the service platform stores the transaction request of transferring assets between the registered parties and the data of original assets obtained by each registered party as the transaction request in the blockchain network, thereby effectively utilizing the blockchain network technology to implement various application functions.

Embodiment 3

Figure 3:
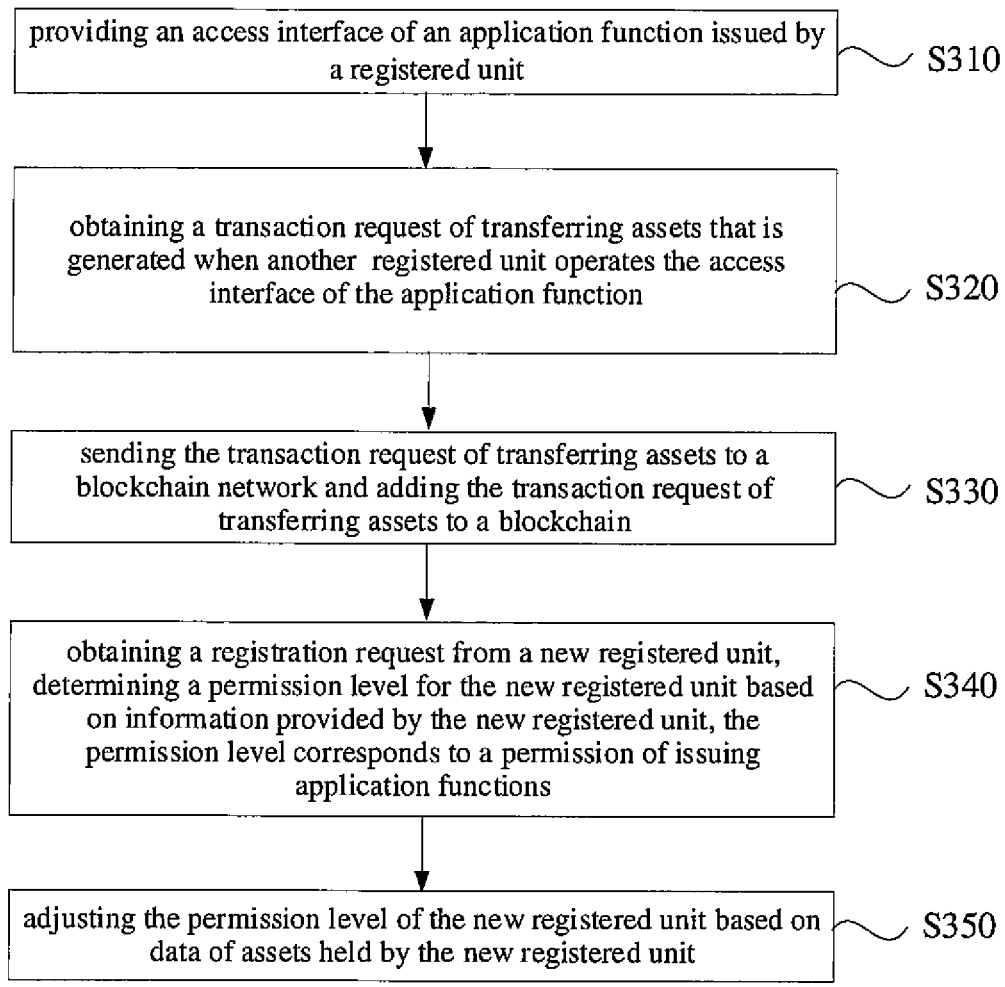
FIG. 3 is a flow chart illustrating a method for implementing an application function according to Embodiment 3 of the present disclosure.

FIG. 3 is a flow chart illustrating a method for implementing an application function according to Embodiment 3 of the present disclosure. This embodiment provides more details on the basis of the above embodiments. As illustrated in FIG. 3, the method may include the following.

At block S310, the access interface of the application function issued by the registered party is provided.

At block S320, the transaction request of transferring assets that is generated when another registered party performs an operation on the access interface of the application function is obtained.

At block S330, the transaction request of transferring assets is sent to the blockchain network and added to the blockchain.

At block S340, a registration request from a new registered party is obtained and a permission level of the new registered party is determined based on information of the new registered party. The permission level corresponds to a permission for issuing an application function.

The registration request is a request sent by the new registered party to the service platform for joining the service platform. Different registered parties have different permissions for issuing the application functions. The permission for issuing the application function may indicate whether to issue the application function, the number of application functions, or a permission for issuing and updating the application function. When the registered party is the planet, different planets have different permissions. For example, the planet having an operating capability may selectively support a certain application function, while an ordinary user may only directly implement the application function provided by other planets and cannot issue any application functions. In another example, some planets may operate the application functions provided on the service platform.

In detail, the service platform may provide a registration page to the new registered party after obtaining the registration request from the new registered uni. The new registered party may perform a telephone verification firstly as directed by the registration page, perform an identity authentication, and perform the registration based on an invitation code. When the registration of the new registered party is successfully done, the service platform may determine the permission level of the new registered party according to the information filled in by the new registered party. The new registered party may perform corresponding operations based on the determined permission level.

In an example, the service platform may assign startup assets to each new registered party. The new registered party may gradually accumulate its assets on the basis of the startup assets by logging in the service platform every day, inviting a new registered party to join the service platform, or issuing information associated with business functions, to subsequently improve its permission level.

At block S350, the permission level of each registered party is adjusted based on the data of assets held by the respective registered party.

In detail, the service platform may obtain the data of assets held by each registered party in real time, and adaptively adjust the permission level of each registered party based on the data of assets. In an example, the data of assets is directly proportional to the permission level. The permission level is correspondingly increased or decreased based on an increase/decrease degree of the data of assets held by each registered party.

It should be noted that, in embodiments, there is no execution order between blocks S310, S320, and S330 for storing the transaction request of transferring assets generated between the registered parties in the blockchain and blocks S340 and S350 for determining the permission level of the new registered party and subsequently adjusting the permission level. Those blocks may be executed simultaneously.

With the technical solution according to embodiments of the present disclosure, the service platform may determine the permission level of the new registered party based on the information provided by the new registered party, and dynamically adjust the permission level of the registered party based on the data of assets accumulated by the registered party. There is provided a method for determining the permission level of the new registered party and subsequently adjusting the permission level.

Embodiment 4

Figure 4A:
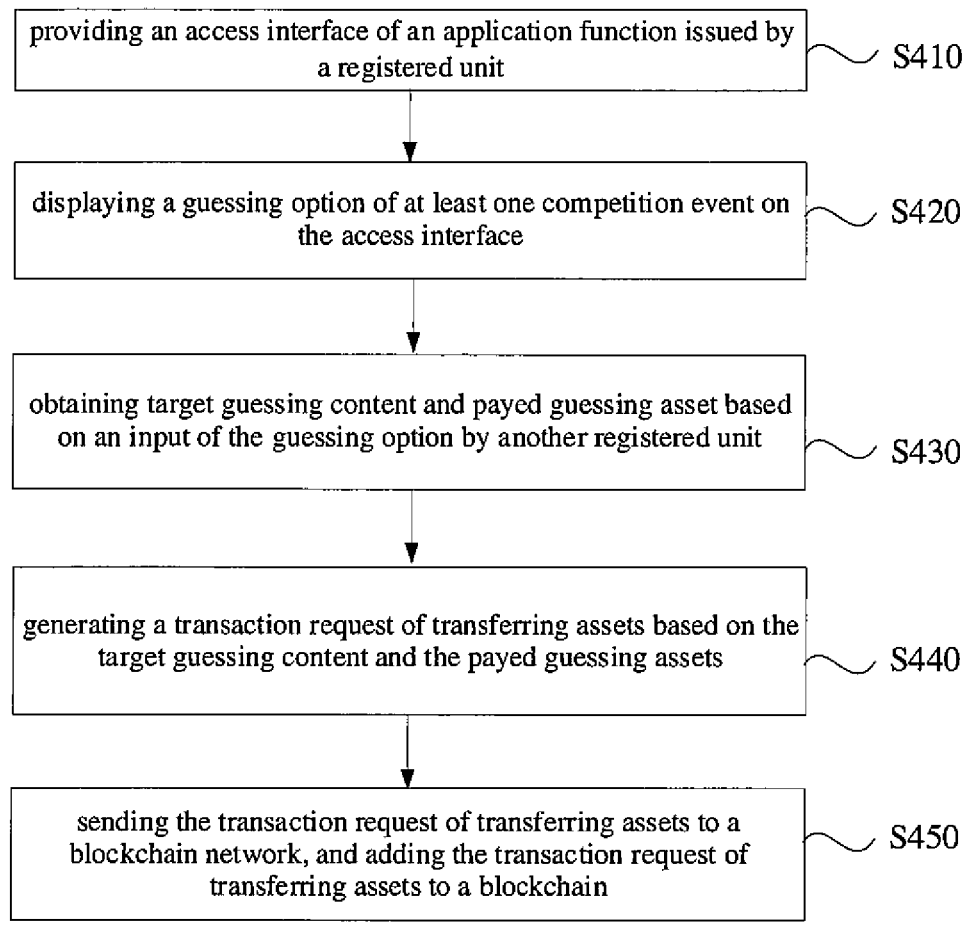
FIG. 4A is a flow chart illustrating a method for implementing an application function according to Embodiment 4 of the present disclosure.

FIG. 4A is a flow chart illustrating a method for implementing an application function according to Embodiment 4 of the present disclosure. This embodiment provides a method for obtaining the transaction request of transferring assets generated when another registered party operates the access interface of an application function in cases that the application function is guessing a competition. As illustrated in FIG. 4A, the method may include the following.

At block S410, the access interface of the application function issued by the registered party is provided.

At block S420, a guessing option of at least one competition event is displayed on the access interface.

The guessing option refers to a possible result of the competition event provided by the registered party, and may be selected by another registered party.

Figure 4B:
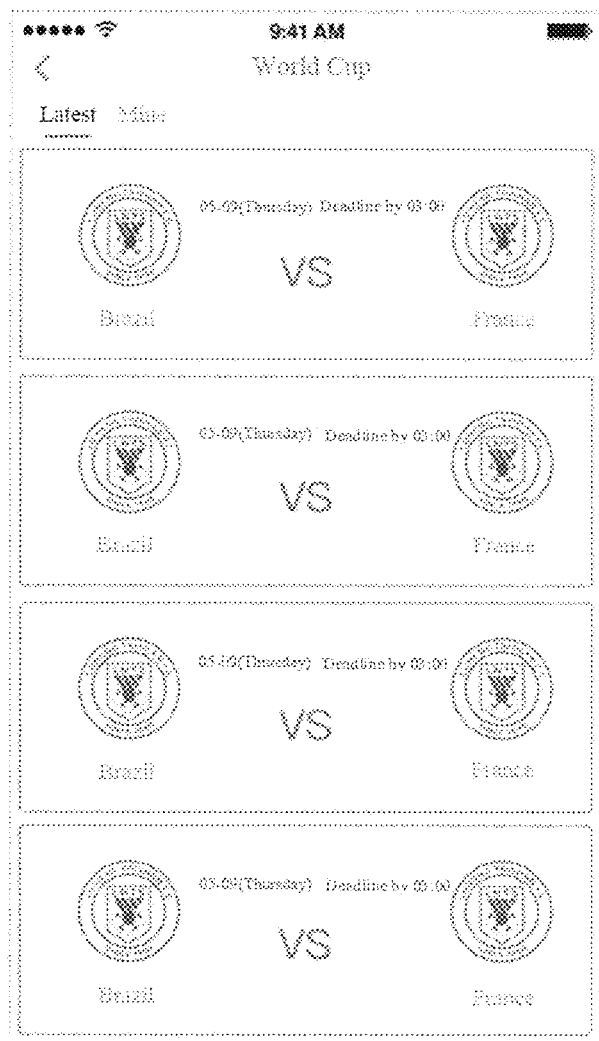
FIG. 4B is a schematic diagram illustrating an access interface of guessing a competition according to Embodiment 4 of the present disclosure.
Figure 4C:
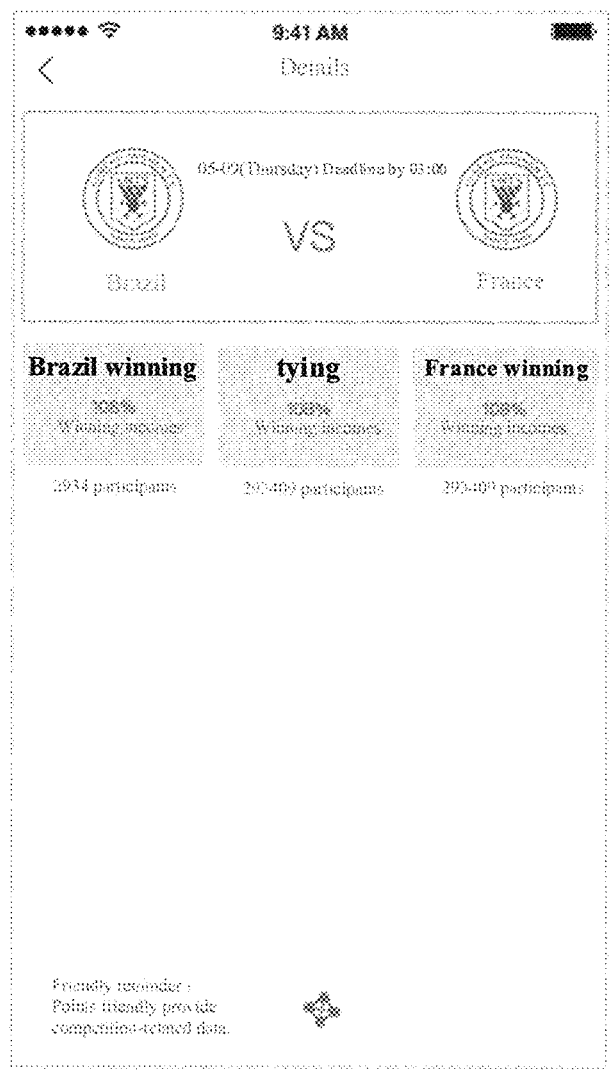
FIG. 4C is a schematic diagram illustrating a detailed interface of a competition event according to Embodiment 4 of the present disclosure.

In detail, a registered party supported by the service platform may query the competition on the search interface. FIG. 4B illustrates the access interface for a World Cup competition. Two optional tabs are provided on the access interface. Competition events that are not started yet are displayed on the optional tab named "latest". The competition events are arranged in an order of starting time and the most recent competition event is displayed at the topmost. Competitions events that have been guessed are displayed on the optional tab named "mine". The competition event are arranged in an order of starting time and the most recent competition event is displayed at the topmost. The registered party may click a linking to enter a detailed page when viewing an interested competition event. FIG. 4C illustrates an interface showing a competition event between Brazil and France, date of the competition, and deadline of guessing the competition. For example, FIG. 4C provides three guessing options including such as Brazil winning, tying with each other and France winning.

In addition, the number of users who are guessing the competition and winning incomes may be provided below each guessing option, as a reference for each registered party to select the guessing option.

At block S430, target guessing content and payed guessing assets are obtained based on an input of the guessing option by another registered party.

Figure 4D:
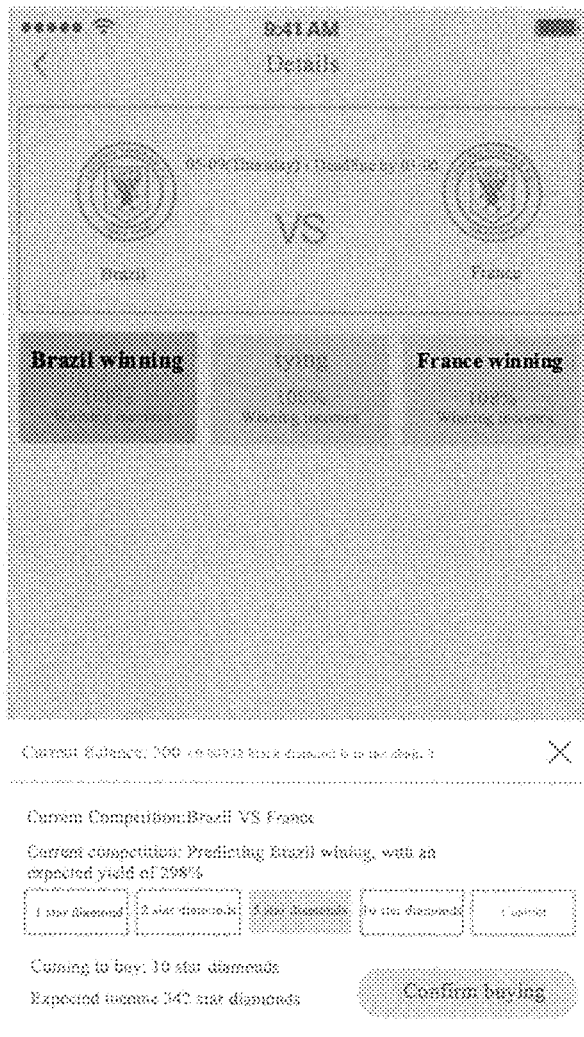
FIG. 4D is a schematic diagram illustrating an access interface that is accessed by a registered party according to Embodiment 4 of the present disclosure.

The target guessing content refers to content, that is obtained by the service platform, corresponding to the guessing option selected by the registered party. As illustrated in FIG. 4D, when the registered party selects Brazil winning from the guessing options, the target guessing content obtained by the service platform is Brazil winning.

Figure 4E:
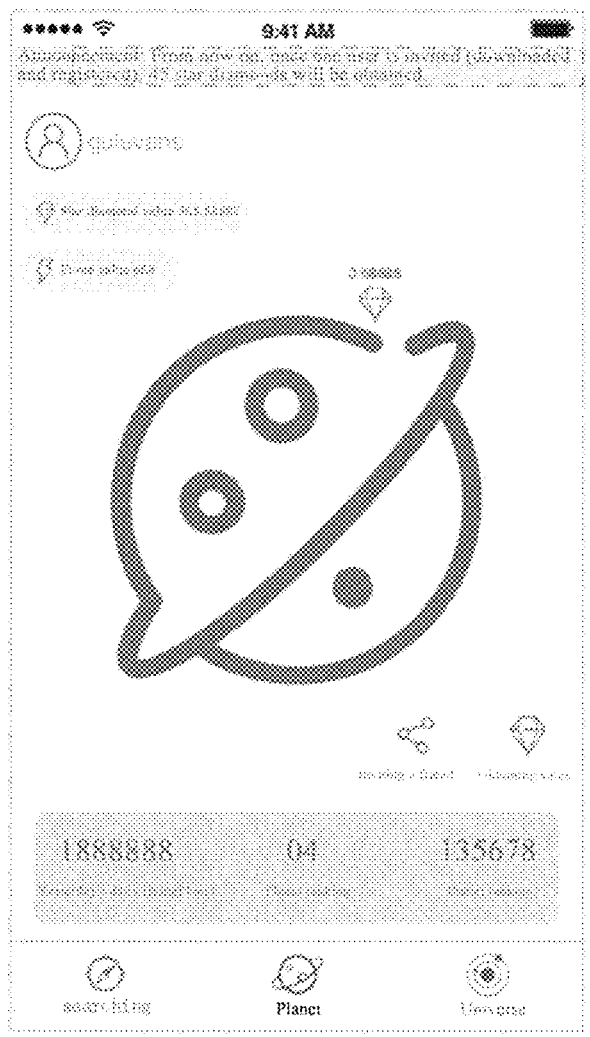
FIG. 4E is a schematic diagram illustrating an interface showing a planet and a star diamond according to Embodiment 4 of the present disclosure.
Figure 4F:
FIG. 4F is a schematic diagram illustrating an interface showing details of a star diamond according to Embodiment 4 of the present disclosure.

The payed guessing assets refer to the assets invested by the registered party for guessing the result of the competition. In an example, for the application function of guessing the competition, the assets may be represented by star diamonds, as illustrated in FIG. 4E. When the registered party clicks to view the star diamond illustrated on FIG. 4E, a page for providing a brief introduction of the star diamond, the number of star diamonds held currently, and incomes and expenditure of the star diamond may be entered, as illustrated in FIG. 4F. The registered party may decide the amount of payed guessing assets based on the number of star diamonds held currently. As illustrated in FIG. 4D, five options are provided as the payed guessing assets, such as 1 star diamond, 2 star diamonds, 5 star diamonds, 10 star diamonds and a customized number of star diamonds. When the number of star diamonds held currently by the registered party is greater than or equal to 2, a default option is 2 star diamonds. In an example, the registered party may perform a selection based on an expected income ratio corresponding to the payed guessing assets.

Figure 4G:
FIG. 4G is a schematic diagram illustrating an interface showing details of purchase records according to Embodiment 4 of the present disclosure.

After the registered party confirms the purchase, the purchase record may be viewed on the optional lab labelled "mine" as illustrated in FIG. 4G. Purchases of the same competition at different times are recorded separately even if the guessing options that are purchased are the same, thereby being convenient for the registered party to view. In addition, a red dot may be displayed on the optional tab labelled "mine" when the result of the purchased competition is known, to prompt the registered party to view the result. The red dot may be cancelled after the registered party views the result.

At block S440, the transaction request of transferring assets is generated based on the target guessing content and the payed guessing assets.

In detail, when the service platform detects that another registered party selects a guessing option and pays a certain amount of payed guessing asset to the registered party providing the application function of guessing the competition, the service platform may generate the transaction request of transferring assets between the two registered parties based on the target guessing content and the payed guessing assets. In an example, the transaction request of transferring assets may include the target guessing content, the payment guessing assets, an identifier of the registered party participating in guessing the competition, an identifier of the registered party providing the application function of guessing the competition.

At block S450, the transaction request of transferring assets is sent to the blockchain network and added to the blockchain.

With the technical solution according to embodiments of the present disclosure, guessing the competition is taken as an example of the application function and a method for generating the transaction request of transferring assets during guessing the competition is provided. As the transaction request of transferring assets between the registered parties is stored in the blockchain network, the blockchain network technology may be effectively utilized to implement various application functions.

Embodiment 5

Figure 5:
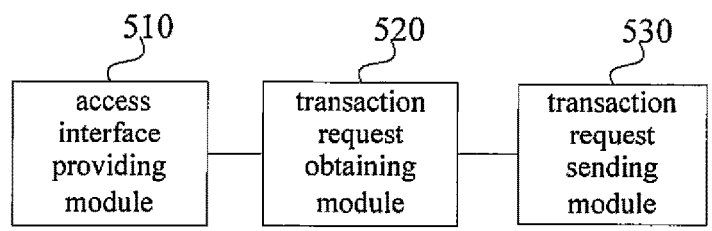
FIG. 5 is a block diagram illustrating an apparatus for implementing an application function according to Embodiment 5 of the present disclosure.

FIG. 5 is a block diagram illustrating an apparatus for implementing an application function according to Embodiment 5 of the present disclosure. The apparatus may be included in a service platform, may be configured to execute a method for implementing an application function according to any of embodiments of the present disclosure. The apparatus may include corresponding function modules for implementing the method and advantageous effects of the method. As illustrated in FIG. 5, the apparatus may include an access interface providing module 510, a transaction request obtaining module 520, and a transaction request sending module 530.

The access interface providing module 510 is configured to provide an access interface of an application function issued by a registered party.

The transaction request obtaining module 520 is configured to obtain a transaction request of transferring assets generated when another registered party operates the access interface of the application function.

The transaction request sending module 530 is configured to send the transaction request of transferring assets to a blockchain network, such that the transaction request of transferring assets is added to a blockchain.

With the technical solution according to embodiments of the present disclosure, the service platform may provide powerful support of the blockchain network for various users and institutions to register various units, issue or implement various application functions, and provide circulating assets. Therefore, various registered parties may implement the application function based on a blockchain technology without establishing the blockchain network by themselves. In detail, the service platform may obtain the transaction request of transferring assets between the registered parties in time through the provided access interface of the application function issued by the registered party, and send the transaction request of transferring assets to the blockchain network for storing. As the transaction request of transferring assets between the registered parties is stored in the blockchain network, the blockchain network technology is effectively utilized to implement various application functions.

In an example, the apparatus may further include an original assets obtaining module and an original assets assigning module.

The original assets obtaining module is configured to obtain original assets generated by the blockchain network.

The original assets assigning module is configured to assign the original assets to each registered party based on a preset rule.

The transaction request sending module 530 is further configured to send data of assets held by the registered party as a transaction request to the blockchain network, to add the transaction request to the blockchain.

In an example, the original assets assigning module is further configured to assign the original assets to each registered party based on a weight value of each registered party.

In an example, the weight value of the registered party may be adjusted based on at least one of: a login state of the registered party on the service platform; a condition of issuing and operating the application function by the registered; and the number of new registered parties invited by the registered party.

In an example, the above apparatus may further include a permission level determining module.

The permission level determining module is configured to obtain a registration request from a new registered party, and determine a permission level for the new registered party based on information provided by the new registered party. The permission level corresponds to a permission of issuing the application function.

In an example, the above apparatus may further include a permission level adjusting module.

The permission level adjusting module is configured to adjust the permission level of the new registered party based on data of assets held by the new registered party.

In an example, the above apparatus may further include an information obtaining module, and an adding module.

The information obtaining module is configured to obtain information of each application function issued on the service platform.

The adding module is configured to add the obtained information of each application function issued on the service platform to a search interface for the registered party to query and link the access interface of each application function.

In an example, in embodiments, the service platform may be named as universe, the registered party may be named as planet, the weight value may be named as gravitation, and the assets may be named as element.

In an example, the application function is guessing a competition. The transaction request obtaining module 520 may be further configured to display a guessing option of at least one competition event on the access interface; obtain target guessing content and payed guessing assets based on an input of the guessing option by another registered party, and generate the transaction request of transferring assets based on the target guessing content and the payed guessing assets.

Embodiment 6

Figure 6:
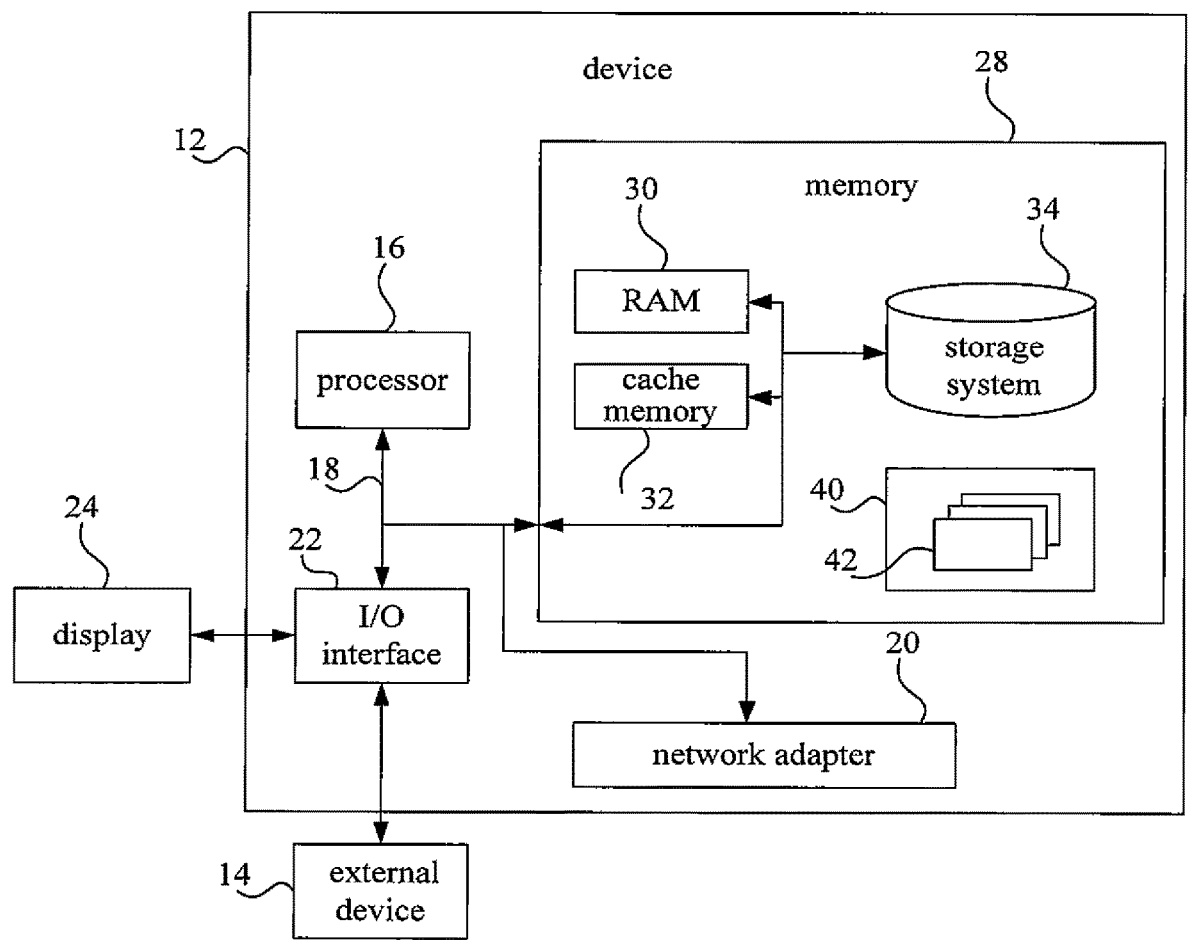
FIG. 6 is a block diagram illustrating a device according to Embodiment 6 of the present disclosure.

FIG. 6 is a block diagram illustrating a device according to Embodiment 6 of the present disclosure. FIG. 6 illustrates a block diagram of a device 12 applicable to execute implementations of the present disclosure. The device 12 illustrated in FIG. 6 is only an example, which may not bring any limitation to functions and scope of embodiments of the present disclosure. In embodiments, the device 12 may typically be a computing device that functions as a node of the blockchain network, or a computing device that independently establish and promote an application service.

As illustrated in FIG. 6, the device 12 is presented in form of a general-purpose computing device. Components of the device 12 may include but be not limited to: one or more processors or processing units 16, a system storage 28, and a bus 18 connecting different system components (including the system storage 28 and the processor 16).

The bus 18 represents one or more of several bus structures, including a storage bus or a local bus with any bus structure in the plurality of bus structures and being employed by a storage controller, a peripheral bus, an accelerated graphics port and a processor. For example, these architectures include, but are not limited to, an industry standard architecture (ISA) bus, a micro channel architecture (MCA) bus, an enhanced ISA bus, a video electronics standards association (VESA) local bus and a peripheral component interconnection (PCI) bus.

The device 12 typically includes a plurality of computer system readable mediums. These mediums may be any usable medium that may be accessed by the device 12, including volatile and non-volatile mediums, removable and non-removable mediums.

The system storage 28 may include computer system readable mediums in the form of volatile medium, such as a random-access memory (RAM) 30 and/or a cache memory 32. The device 12 may further include other movable/unmovable, volatile/non-volatile computer system storage mediums. Only as an example, the storage system 34 may be configured to read from and write to unmovable and non-volatile magnetic mediums (not illustrated in FIG. 6, and usually called "a hard disk driver"). Although not illustrated in FIG. 6, a magnetic disk driver configured to read from and write to the movable and non-volatile magnetic disc (such as "a diskette"), and an optical disc driver configured to read from and write to a movable and non-volatile optical disc (such as a compact disc-read only memory (CD-ROM), a digital video disc-read only memory (DVD-ROM) or other optical mediums) may be provided. Under these circumstances, each driver may be connected to the bus 18 by one or more data medium interfaces. The storage 28 may include at least one program product. The program product has a set of program modules (such as, at least one program module), and these program modules are configured to execute functions of respective embodiments of the present disclosure.

A program/utility tool 40, having a set (at least one) of program modules 42, may be stored in the system storage 28. Such program modules 26 include, but not are limited to, an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, and a display 24), may also communicate with one or more devices enabling a user to interact with the device 12, and/or may communicate with any device (such as a network card, and a modem) enabling the device 12 to communicate with one or more other computing devices. Such communication may occur via an input/output (I/O) interface 22. Moreover, the device 12 may further communicate with one or more networks (such as local area network (LAN), wide area network (WAN) and/or public network, such as Internet) via a network adapter 20. As illustrated in FIG. 6, the network adapter 20 communicates with other modules of the device 12 via the bus 18. It should be understood that, although not illustrated in FIG. 6, other hardware and/or software modules may be used in combination with the device 12, including but being not limited to: microcode, device drivers, redundant processing units, external disk drive arrays, RAID (redundant array of independent disks) systems, tape drives, and data backup storage systems, etc.

The processor 16, by operating programs stored in the system storage 28, executes various function applications and data processing, for example implements a method for implementing an application function provided in embodiments of the present disclosure.

Embodiment 7

Embodiment 7 of the present disclosure also provides a computer readable storage medium having a computer program stored thereon. A method for implementing the application function according to embodiments of the present disclosure may be executed when the program is executed by a computer processor.

The computer storage medium in embodiments of the present disclosure may employ any combination of one or more computer readable mediums. The computer readable medium may be a computer readable signal medium or a computer readable storage medium. The computer readable storage medium may be, such as, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as a part of a carrier, in which computer readable program codes are carried. The transmitted data signal may employ a plurality of forms, including but not limited to, an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

Although a specific illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for implementing an application function, applicable to a service platform, wherein the method comprises:
providing an access interface of an application function issued by a registered party;
obtaining a transaction request of transferring assets that is generated when another registered party operates the access interface of the application function; and
sending the transaction request of transferring assets to a blockchain network, and adding the transaction request of transferring assets added to a blockchain;
where in the method further comprises:
obtaining a second proportion of the original assets to a second registered party, wherein a first proportion is greater than the second proportion when a login frequency of the first registered party on the service platform is higher than a login frequency of the second registered party on the service platform; and
sending data of assets held by each registered party as a further transaction request to the blockchain network, and adding the further transaction request to the blockchain.

2. The method of claim 1, further comprising:
assigning the original assets to the first registered party and the second registered party at least depending on a condition of issuing and operating application functions by the first and second registered party; or
assigning the original assets to the first registered party and the second registered party at least depending on the number of new registered parties invited by the first and second registered party.

3. The method of claim 1, wherein the method further comprises:
obtaining a registration request from a new registered party, determining a permission level for the new registered party based on information provided by the new registered party, wherein the permission level corresponding to a permission of issuing application functions.

4. The method of claim 3, wherein the method further comprises:
adjusting the permission level of the new registered party based on data of assets held by the new registered party.

5. The method of claim 1, wherein the method further comprises:
obtaining information of each application function issued on the service platform; and
adding the information to a search interface for each registered party to query and link the access interface of each application function.

6. The method of claim 1, wherein the service platform is named as universe; the registered party is named as planet; the weight value is named as gravitation; and the assets are named as element.

7. A device, comprising:
one or more processors; and
a storage device, configured to store one or more programs, wherein when the one or more programs are executed by the one or more processors, the one or more processors are configured to
obtain a transaction request of transferring assets that is generated when another registered party operates an access interface of an application function issued by a registered party; and send the transaction request of transferring assets to a blockchain network, and add the transaction request of transferring assets added to a blockchain, wherein the one or more processor are further configured to:

obtain original assets generated by the blockchain network;

assign a first proportion of the original assets to a first registered party and assign a second proportion of the original assets to a second registered party, wherein a first proportion is greater than the second proportion when a login frequency of the first registered party on the service platform is higher than a login frequency of the second registered party on the service platform; and;

sending data of assets held by each registered party as a further the transaction request to the blockchain network, and adding the further transaction request to the blockchain.

8. The device of claim 7, wherein the one or more processors are further configured to:

assigning the original assets to the first registered party and the second registered party at least depending on a condition of issuing and operating application functions by the first and second registered party; or assigning the original assets to the first registered party and the second registered party at least depending on the number of new registered parties invited by the first and second registered party.

9. The device of claim 7, wherein the one or more processors are further configured to:

obtain a registration request from a new registered party, determine a permission level for the new registered party based on information provided by the new registered party, wherein the permission level corresponding to a permission of issuing application functions.

10. The device of claim 9, wherein the one or more processors are further configured to:

adjust the permission level of the new registered party based on data of assets held by the new registered party.

11. The device of claim 7, wherein the one or more processors are further configured to:

obtain information of each application function issued on the service platform; and add the information to a search interface for each registered party to query and link the access interface of each application function.

12. A non-transitory computer readable storage medium having a computer program stored thereon, wherein a method for implementing an application function when the computer program is executed by a processor, the method comprising:

providing an access interface of an application function issued by a registered party;

obtaining a transaction request of transferring assets that is generated when another registered party operates the access interface of the application function; and sending the transaction request of transferring assets to a blockchain network, and adding the transaction request of transferring assets added to a blockchain;

wherein the method further comprises:

obtaining original assets generated by the blockchain network;

assigning a first proportion of the original assets to a first registered party and assigning a second proportion of the original assets to a second registered party, wherein proportion is greater than the second proportion when a login frequency of the first registered party on the service platform is higher than a login frequency of the second registered party on the service platform; and sending data of assets held by each registered party as a further transaction request to the blockchain network, and adding the further transaction request to the blockchain.

13. The non-transitory computer readable storage medium of claim 12, wherein the method further comprises:

assigning the original assets to the first registered party and the second registered party at least depending on a condition of issuing and operating application functions by the first and second registered party; or assigning the original assets to the first registered party and the second registered party at least depending on the number of new registered parties invited by the first and second registered party.

14. The non-transitory computer readable storage medium of claim 12, wherein the method further comprises:

obtaining a registration request from a new registered party, determining a permission level for the new registered party based on information provided by the new registered party, wherein the permission level corresponding to a permission of issuing application functions.

* * * * *